(12) United States Patent
Oba et al.

(10) Patent No.: US 7,862,107 B2
(45) Date of Patent: Jan. 4, 2011

(54) COVER FOR VEHICLE

(75) Inventors: Toru Oba, Toyota (JP); Akira Suzuki, Nagoya (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 335 days.

(21) Appl. No.: 11/878,238

(22) Filed: Jul. 23, 2007

(65) Prior Publication Data
US 2008/0029322 A1    Feb. 7, 2008

(30) Foreign Application Priority Data
Aug. 4, 2006    (JP)    ............................ 2006-213038

(51) Int. Cl.
B62D 25/10    (2006.01)
(52) U.S. Cl. ................................. 296/193.11
(58) Field of Classification Search ............... 180/69.2, 180/69.21, 69.24; 296/193.09, 193.11; 52/171.1; 60/585; 220/86.2, 562
See application file for complete search history.

(56) References Cited

U.S. PATENT DOCUMENTS

| | | | | |
|---|---|---|---|---|
| 1,911,600 A * | 5/1933 | Bobertz, Jr. et al. | ........ | 180/69.2 |
| 2,410,734 A * | 11/1946 | Hitzelberger | .............. | 180/69.2 |
| 2,413,792 A * | 1/1947 | Sharp | ......................... | 180/69.2 |
| 3,583,513 A * | 6/1971 | Macadam et al. | ......... | 180/69.24 |
| 4,153,291 A * | 5/1979 | Conti et al. | ................. | 180/69.2 |
| 4,850,444 A * | 7/1989 | Bojanowski et al. | ....... | 180/68.1 |
| 5,040,628 A * | 8/1991 | Price | ........................ | 180/69.21 |
| 5,123,695 A * | 6/1992 | Kanemitsu et al. | ..... | 296/193.09 |
| 5,275,249 A * | 1/1994 | Nelson | ....................... | 180/69.2 |
| 5,890,258 A * | 4/1999 | Lee | .............................. | 15/320 |
| 5,950,753 A * | 9/1999 | Muldoon et al. | ........... | 180/68.1 |
| 6,655,486 B2 * | 12/2003 | Oshikawa et al. | ........... | 180/68.1 |
| 6,880,882 B2 * | 4/2005 | Andre et al. | ........... | 296/193.09 |
| 7,234,555 B2 * | 6/2007 | Khouw et al. | .............. | 180/68.3 |
| 7,287,614 B2 * | 10/2007 | Chernoff et al. | ........... | 180/69.2 |
| 2005/0218699 A1 * | 10/2005 | Andre et al. | ........... | 296/193.09 |
| 2006/0260854 A1 * | 11/2006 | Chernoff et al. | ........... | 180/69.2 |
| 2009/0039680 A1 * | 2/2009 | Takayanagi et al. | .... | 296/193.09 |
| 2009/0066116 A1 * | 3/2009 | Kuroita et al. | ......... | 296/193.09 |
| 2009/0108631 A1 * | 4/2009 | Jyo et al. | ................ | 296/193.09 |
| 2009/0179460 A1 * | 7/2009 | Peterson | ................ | 296/193.11 |

FOREIGN PATENT DOCUMENTS

| | | |
|---|---|---|
| JP | U-63-161030 | 10/1988 |
| JP | A-02-006225 | 1/1990 |
| JP | A-05-032130 | 2/1993 |
| JP | A-07-101254 | 4/1995 |
| JP | A-08-268336 | 10/1996 |
| JP | 09109841 A * | 4/1997 |
| JP | A 2000-296766 | 10/2000 |
| JP | A 2003-328754 | 11/2003 |

* cited by examiner

*Primary Examiner*—Glenn Dayoan
*Assistant Examiner*—Paul A Chenevert
(74) *Attorney, Agent, or Firm*—Oliff & Berridge, PLC

(57) ABSTRACT

An intake system cover for a vehicle is mounted in an engine compartment to cover a reservoir tank that stores coolant for an engine. The intake system cover for the vehicle is formed with a light introduction opening for introducing light to be directed toward a liquid level gauge at a side of the reservoir tank. The visibility of the liquid level of the reservoir tank at the liquid level gauge is improved.

21 Claims, 7 Drawing Sheets

COVER FOR VEHICLE

INCORPORATION BY REFERENCE

The disclosure of Japanese Patent Application No. 2006-213038 filed on Aug. 4, 2006 including the specification, drawings and abstract is incorporated herein by reference in its entirety.

BACKGROUND OF THE INVENTION

1. Field of the Invention

The present invention relates to a cover for a vehicle.

2. Description of the Related Art

An engine for a vehicle is provided with a cooling system that maintains the engine at an appropriate temperature according to the operating condition. The cooling system includes a radiator that releases the heat of coolant in the engine to the outside, and a reservoir tank that stores coolant for a refill. In the cooling system, coolant is supplied from the reservoir tank to the radiator, and discharged in the opposite way, according to pressure changes of coolant in the radiator.

The reservoir tank is disposed, for example, at the rear of the radiator 101 in the engine compartment 100, as shown in the Prior Art illustrated in FIG. 9. A liquid level gauge is provided at a side of the reservoir tank 102, allowing checking of the coolant level in the reservoir tank 102.

JP-A-2003-328754 and JP-A-2000-296766, for example, disclose a structure that facilitates checking the coolant level in a reservoir tank.

Various types of covers are occasionally mounted in an engine compartment to improve the design of the engine compartment with an engine hood open, preventing various members in the engine compartment from being soiled with dust or the like. In the case where such a cover is mounted, it is occasionally inevitable that the reservoir tank is disposed below the cover due to the layout in the engine compartment. In such a case, the reservoir tank 102 is covered by the cover 103, which darkens the vicinity of the liquid level gauge and thus makes it difficult to check the coolant level through the liquid level gauge.

SUMMARY OF THE INVENTION

The present invention improves the visibility of the liquid level of a reservoir tank at a liquid level gauge, with the reservoir tank arranged under a cover for a vehicle mounted to an engine compartment so as to cover the reservoir tank from above.

An aspect of the present invention provides a cover for a vehicle that is mounted in the engine compartment to cover a reservoir tank for storing coolant for an engine, in which the cover is formed with a light introduction opening that directs light toward a liquid level gauge at a side of the reservoir tank.

According to this construction, the vicinity of the liquid level gauge of the reservoir tank is brightened even when the reservoir tank is covered by the cover, thereby improving the visibility of the liquid level at the liquid level gauge.

In the cover for a vehicle, the light introduction opening may include a plurality of slits that extend in parallel with each other. According to this construction, light introduced under the cover through the plurality of slits is dispersed by diffraction. Thus, it is possible to suitably maintain the visibility of the liquid level at the liquid level gauge, as well as to prevent an intended function of the cover from being spoiled by an increase in opening area of the light introduction opening. For example, it is possible to prevent design deterioration that various members in the engine compartment covered by the cover are visible from outside through the light introduction opening.

In the cover for a vehicle, the light introduction opening may be formed at a position displaced in a direction of a plane where the cover extends, from a position opposite to a top of the reservoir tank; and a slit defining part, positioned between adjacent slits to define the slits, may be slanted such that its lower end is closer to the reservoir tank than its upper end.

According to this construction, light passing through the slits is oriented toward the reservoir tank, thus further improving the visibility of the liquid level at the liquid level gauge.

In the cover for a vehicle, the light introduction opening may be formed to be generally rectangular at a position displaced in a direction of a plane where the cover extends, from a position opposite to a top of the reservoir tank; and the light introduction opening may be provided with an extension that extends obliquely downward toward the reservoir tank from an opening edge farthest from the reservoir tank.

In this way, the extension of the light introduction opening orients light introduced through the light introduction opening toward the reservoir tank, while the opening area of the light introduction opening is reduced. Thus, it is also possible to suitably maintain the visibility of the liquid level at the liquid level gauge, as well as to prevent an intended function of the cover from being spoiled by an increase in opening area of the light introduction opening. For example, it is possible to prevent design deterioration that various members in the engine compartment covered by the cover are visible from outside through the light introduction opening.

In the cover for a vehicle, the light introduction opening may be formed to be generally rectangular at a position displaced in a direction of a plane where the cover extends, from a position opposite to a top of the reservoir tank; and the light introduction opening may be provided with an extension that extends obliquely upward away from the reservoir tank from an opening edge closest to the reservoir tank.

In this way, the extension of the light introduction opening orients light introduced through the light introduction opening toward the reservoir tank, while the opening area of the light introduction opening is reduced. Thus, it is also possible to suitably maintain the visibility of the liquid level at the liquid level gauge, as well as to prevent an intended function of the cover from being spoiled by an increase in opening area of the light introduction opening. For example, it is possible to prevent design deterioration that various members in the engine compartment covered by the cover are visible from outside through the light introduction opening.

In the cover for a vehicle, the light introduction opening may be formed at a position behind the reservoir tank.

According to this construction, it is possible to suitably prevent design deterioration that various members in the engine compartment covered by the cover are visible through the light introduction opening as the engine compartment is viewed from ahead of the vehicle with the engine hood open.

In the cover for a vehicle, a mount for mounting the cover to an engine compartment may be formed adjacent to the light introduction opening.

With the light introduction opening formed in the cover as discussed above, the rigidity of the portion of the cover where the light introduction opening is formed may be reduced and thus might be deformed by heat in the engine compartment or might be displaced by vibrations that occur while the vehicle is running. Thus, the cover may contact its peripheral members and produce unusual sounds. According to the above construction, the cover is mounted to the engine compartment at a position adjacent to the light introduction opening, thus suitably preventing deformation due to heat and generation of unusual sounds such as discussed above.

The cover for a vehicle may be mounted to an engine compartment so as to cover an intake system of the engine; and the cover may be used for the intake system to prevent heated air in the engine compartment from being inducted through an air intake of the intake system by means of a seal part disposed between the cover and an engine hood.

In general, a reservoir tank connected to a radiator and an air intake port of an engine are occasionally disposed adjacent to each other at the front of a vehicle. In such a case, an intake system cover for preventing heated air in an engine compartment from being inducted through the air intake may be mounted in the engine compartment. However, the intake system cover may completely cover the reservoir tank and darkens the vicinity of a liquid level gauge of the reservoir tank, thus making it difficult to visually inspect the liquid level gauge. According to the above construction, it is possible to maintain the visibility of the liquid level at the liquid level gauge even if such an intake system cover is mounted to the engine compartment.

A visual inspection opening that allows visual inspection of the liquid level gauge may be formed separately from the light introduction opening; and the light introduction opening may be formed at a position closer to the reservoir tank than the visual inspection opening.

According to this construction, even if the intake system cover used is large enough to prevent an increase in intake temperature, the vicinity of the liquid level gauge is brightened by light introduced through the light introduction opening, thereby facilitating checking of the liquid level of coolant through the visual inspection opening.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EXAMPLE EMBODIMENTS

Figure 1:
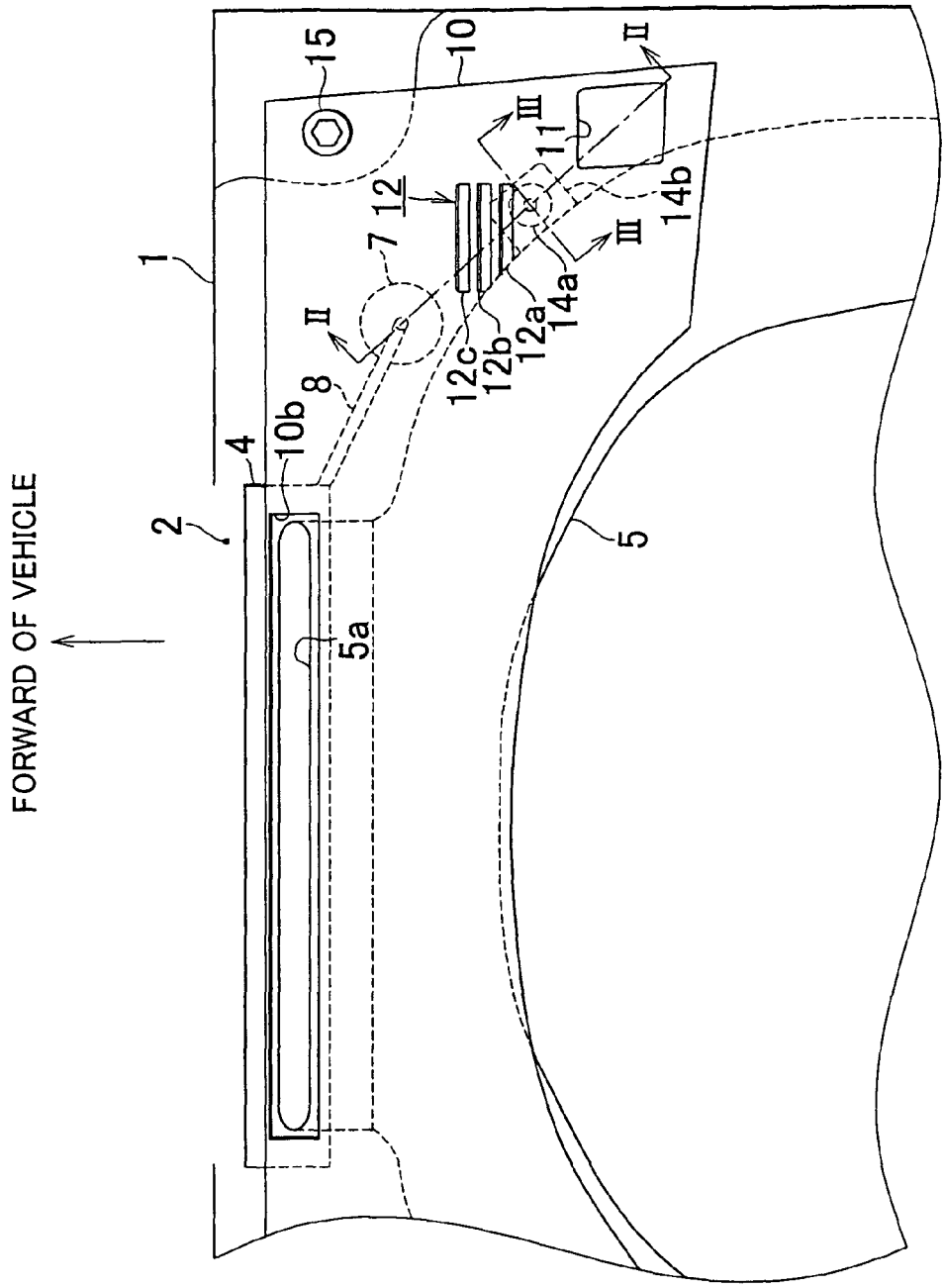
FIG. 1 is a plan view partially showing the construction of a cover for a vehicle according to the present invention.

An embodiment in which a cover for a vehicle according to the present invention is applied as an intake system cover provided in an engine compartment of a V-type engine will now be described with reference to FIGS. 1 to 3. As shown in FIG. 1, a radiator grille 2 is provided at the front of an engine compartment 1 in a vehicle. A radiator 4 is disposed behind the radiator grille 2. An intake duct 5 is provided behind the radiator 4. The intake duct 5 has an air intake opening 5a toward the front of the vehicle, and is divided at its rear part into two branches (not shown) connected to respective banks of the engine. Air is inducted through the radiator grille 2 into the air intake 5a of the intake duct 5, and then supplied through the intake duct 5 to an engine (not shown).

A reservoir tank 7 is disposed in a space in the engine compartment 1 between a vehicle body and the intake duct 5, and fixed to the vehicle body through a stay (not shown). The reservoir tank 7 is connected to the radiator 4 through piping 8. Coolant is supplied from the reservoir tank 7 to the radiator 4, and discharged in the opposite way, through the piping 8.

Figure 2:
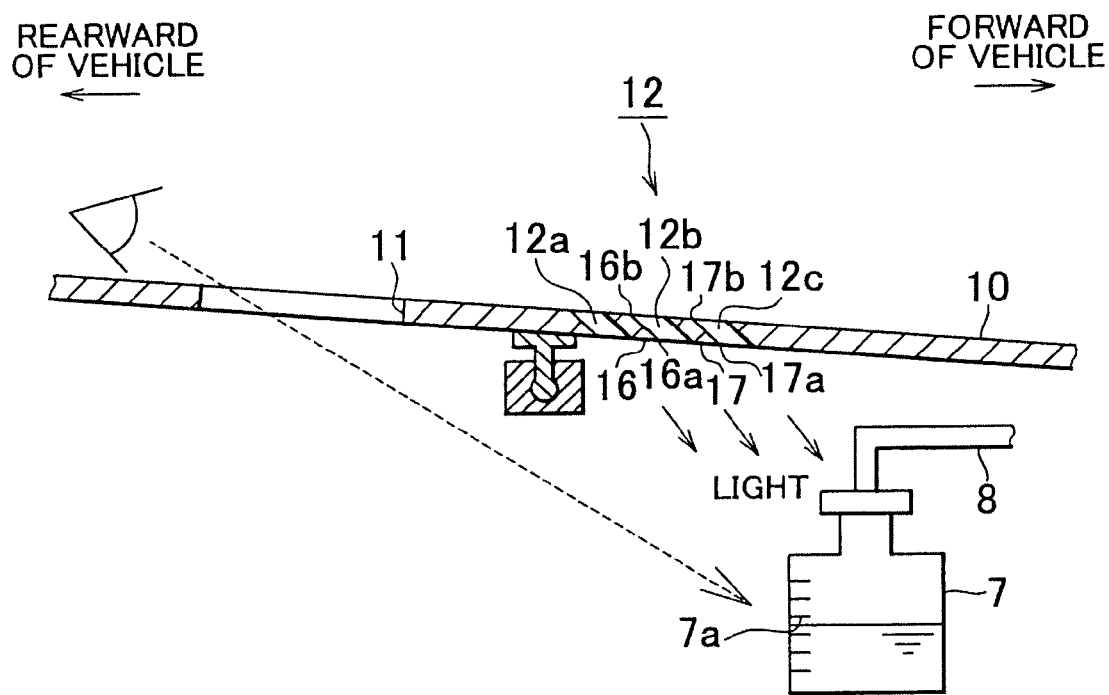
FIG. 2 is a cross sectional view taken along the line II-II of FIG. 1.
Figure 3:
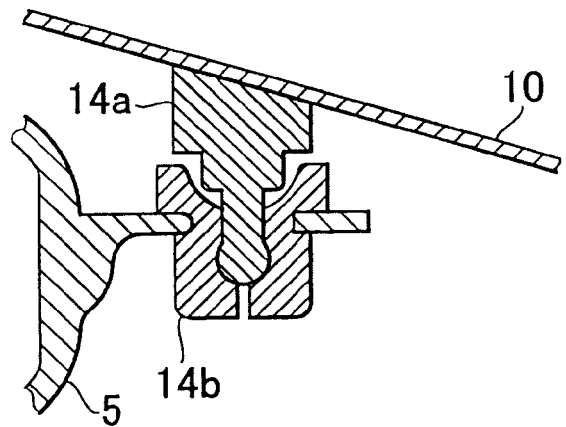
FIG. 3 is a cross sectional view taken along the line III-III of FIG. 1.

As shown in FIG. 2, a liquid level gauge 7a is provided on one side of the reservoir tank 7. The liquid level gauge 7a is oriented toward a visual inspection opening 11 of an intake system cover 10, which will be described later.

An intake system cover 10 (hereinafter simply referred to as "cover 10") is disposed in the engine compartment 1 so as to cover a part of the intake duct 5 and the reservoir tank 7 from vertically above. The cover 10 is brought into tight contact with a seal part (not shown) provided to an engine hood (not shown) when the engine hood is closed, preventing heated air in the engine compartment 1 from being inducted through the air intake 5a. The cover 10 is formed with an opening 10b at a position corresponding to the air intake 5a.

A visual inspection opening 11 that allows visual inspection of the liquid level gauge 7a is formed in the cover 10 at a position behind the reservoir tank 7. A light introduction opening 12 is formed in the cover 10 between the visual inspection opening 11 and the reservoir tank 7. The light introduction opening 12 may include three slits 12a to 12c that extend transversely in parallel to each other. Parts of the light introduction opening 12 between adjacent slits 12a to 12c, namely a slit defining part 16 between the slits 12a and 12b and a slit defining part 17 between the slits 12b and 12c, are slanted such that their lower ends 16a and 17a are closer to the reservoir tank 7 than their upper ends 16b and 17b are, respectively.

As shown in FIG. 1, a mount 14a is formed at a part of the cover 10 adjacent to the light introduction opening 12. The cover 10 is fixed to the vehicle body by a bolt 15, and as shown in FIG. 1, mounted to the engine compartment 1 with the mount 14a fixed to a support part 14b provided to the intake duct 5.

With the vehicle constructed as described above, an operator opens the engine hood of the vehicle and then views the liquid level gauge 7a through the visual inspection opening 11 of the cover 10, as shown in FIG. 2, in order to visually inspect the liquid level of the reservoir tank 7 at the liquid level gauge 7a. At this time, light directed toward the liquid level gauge 7a is introduced to the liquid level gauge 7a, by means of the light introduction opening 12 formed in the cover 10.

According to the embodiment of the present invention discussed in detail above, the following functions and effects are obtained.

First, the vicinity of the liquid level gauge 7a of the reservoir tank 7 is brightened even if the reservoir tank 7 is covered by the cover 10 from above, which improves the visibility of the liquid level at the liquid level gauge 7a.

Second, light introduced under the cover 10 through the plurality of slits 12a to 12c is dispersed by diffraction. Thus, it is possible to suitably maintain the visibility of the liquid level at the liquid level gauge 7a, as well as to prevent an intended function of the cover 10 from being spoiled by an increase in opening area of the light introduction opening 12. For example, it is possible to prevent design deterioration that various members in the engine compartment 1 covered by the cover 10 are visible from outside through the light introduction opening 12.

Third, light passing through the slits 12a to 12c is oriented toward the reservoir tank 7, thus further improving the visibility of the liquid level at the liquid level gauge.

In addition, the light introduction opening 12 is formed at a position behind the reservoir tank 7, and the slits 12a to 12c of the light introduction opening 12 are slanted toward the reservoir tank 7. Thus, it is possible to suitably prevent design deterioration that various members in the engine compartment 1 covered by the cover 10 are visible through the light introduction opening 12 when the engine compartment 1 is viewed from the front of the vehicle while the engine hood is open.

Furthermore, because the light introduction opening 12 is formed in the cover 10, the rigidity of the cover 10 where the light introduction opening 12 is formed may be reduced and thus might be deformed by heat in the engine compartment 1 or might be displaced by vibrations that occur while the vehicle is running. Thus the cover may contact its peripheral members and produce unusual sounds. With the cover 10 according to this embodiment, the cover 10 is mounted to the engine compartment 1 at a position adjacent to the light introduction opening 12, thus suitably preventing deformation due to heat and generation of unusual sounds such as discussed above.

In general, a reservoir tank connected to a radiator and an air intake port of an engine are occasionally disposed adjacent to each other at the front of a vehicle. In such a case, an intake system cover for preventing heated air in the engine compartment from being inducted through the air intake may be mounted in the engine compartment. However, the intake system cover may completely cover the reservoir tank and darkens the vicinity of a liquid level gauge of the reservoir tank, thus making it difficult to visually inspect the liquid level gauge. With the construction according to this embodiment, the visibility of the liquid level at the liquid level gauge 7a may be maintained favorably.

Finally, the cover 10 is formed with the visual inspection opening 11 to allow visual inspection of the liquid level gauge 7a. Thus, even if the cover used is large, the vicinity of the liquid level gauge 7a is brightened by light introduced through the light introduction opening 12, facilitating inspection of the liquid level of coolant through the visual inspection opening 11.

The above embodiment may be modified as described below. Although the cover 10 is provided with the visual inspection opening 11 to allow visual inspection of the liquid level gauge 7a of the reservoir tank 7 in the above embodiment, a cover not provided with such a visual inspection opening may alternatively be used. In this case, the liquid level gauge 7a of the reservoir tank 7 may be visually inspected through a gap between the rear end of the cover 10 and the intake duct 5.

Although the mount 14a for mounting the cover 10 is formed at the part of the cover 10 adjacent to the light introduction opening 12 in the above embodiment, the mount may be formed further away from the light introduction opening 12, or the mount may be omitted.

Figure 4:
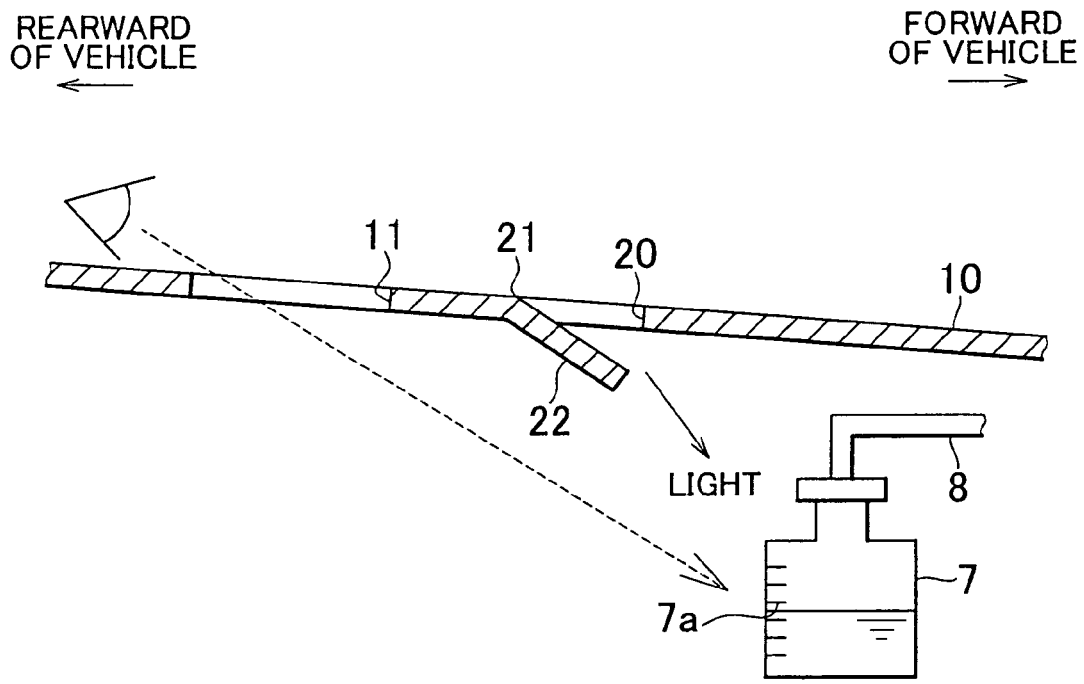
FIG. 4 is a cross sectional view showing a modified example of a cover for a vehicle according to the present invention.
Figure 5:
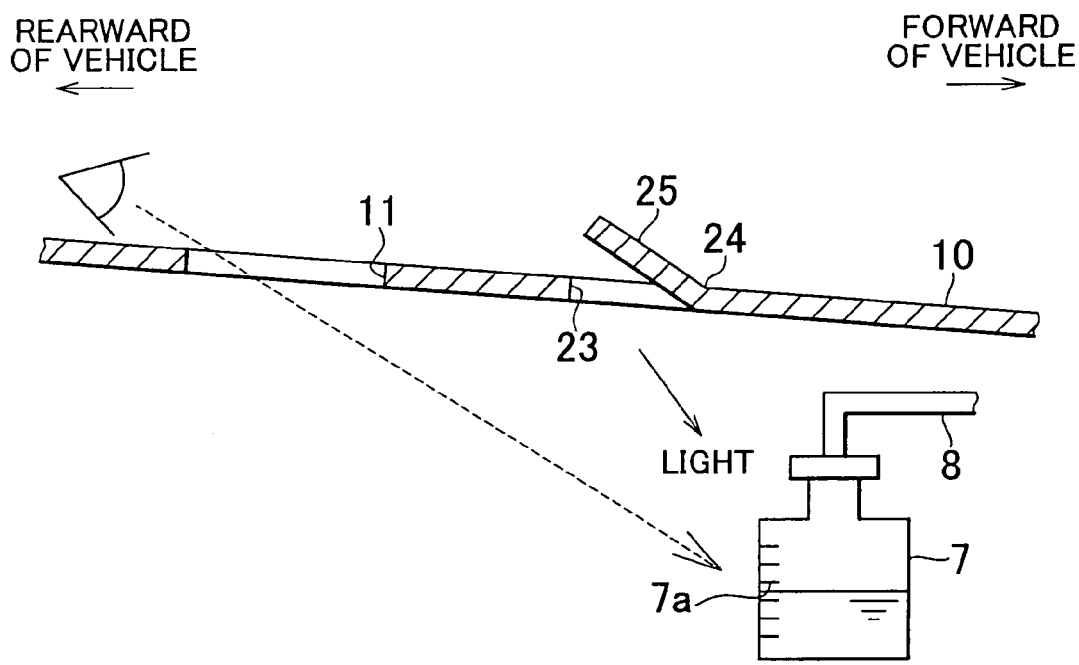
FIG. 5 is a cross sectional view showing another modified example of a cover for a vehicle according to the present invention.

Although the light introduction opening 12 includes the slits 12a to 12c in the above embodiment, the light introduction opening 12 may be shaped otherwise. For example, the light introduction opening 12 may have a rectangular or circular shape. An example of rectangular light introduction opening is a light introduction opening 20 shown in FIG. 4, which is formed with an extension 22 extending obliquely downward toward the reservoir tank 7 from an opening edge 21 farther from the reservoir tank 7. Another example is a light introduction opening 23 shown in FIG. 5, which is formed with an extension 25 extending obliquely upward away from the reservoir tank 7 from an opening edge 24 closer to the reservoir tank 7.

According to these configurations, the extension 22, 25 of the light introduction opening 20, 23 orients the light introduced through the light introduction opening 20, 23 toward the reservoir tank 7, while reducing the opening area of the light introduction opening 20, 23. Thus, it is possible to suitably maintain the visibility of the liquid level at the liquid level gauge 7a, as well as to prevent an intended function of the cover 10 from being spoiled by an increase in opening area of the light introduction opening 20 or 23. For example, it is possible to prevent design deterioration that various members in the engine compartment 1 covered by the cover 10 are visible from outside through the light introduction opening 20 or 23.

Figure 6:
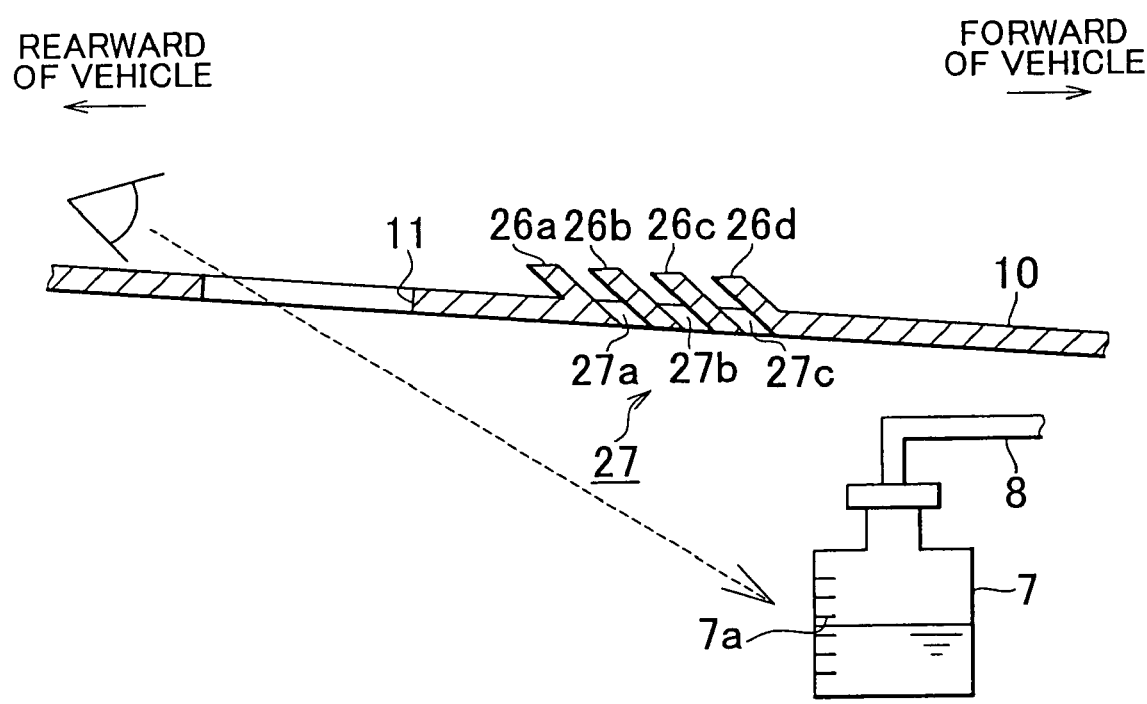
FIG. 6 is a cross sectional view showing another modified example of a cover for a vehicle according to the present invention.

As in the light introduction opening 27 shown in FIG. 6, slit defining parts 26a to 26d that define slits 27a to 27c may be formed to project upward from an upper surface of the cover 10. With this configuration, it is possible to further prevent design deterioration that various members in the engine compartment 1 covered by the cover 10 are visible from outside through the light introduction opening 27.

Figure 7:
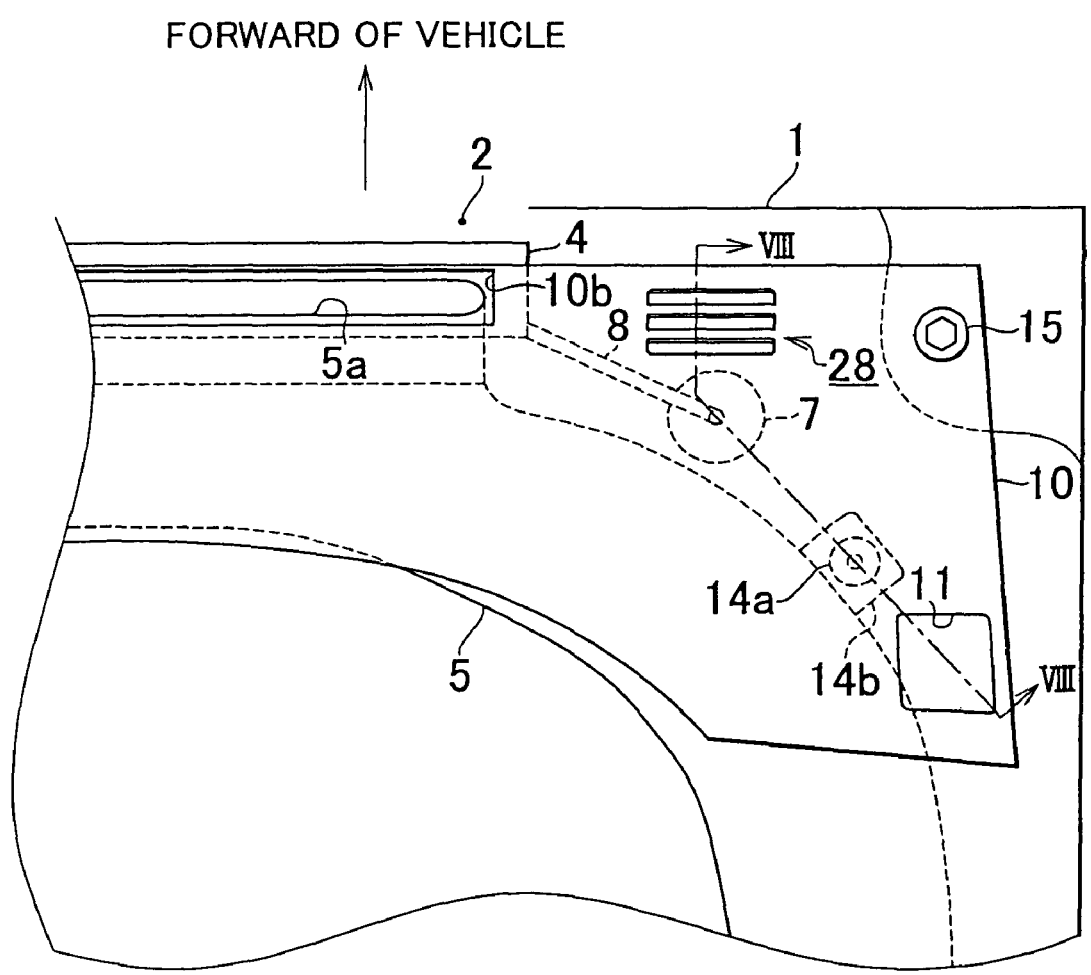
FIG. 7 is a plan view showing another modified example of a cover for a vehicle according to the present invention.
Figure 8:
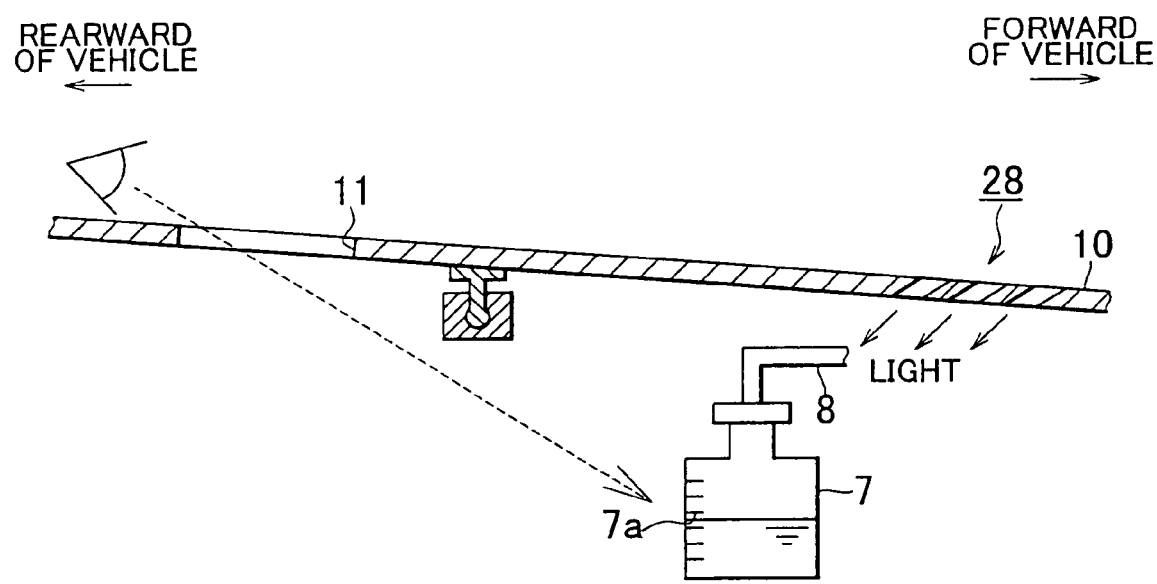
FIG. 8 is a cross sectional view taken along the line VIII-VIII of FIG. 7.
Figure 9:
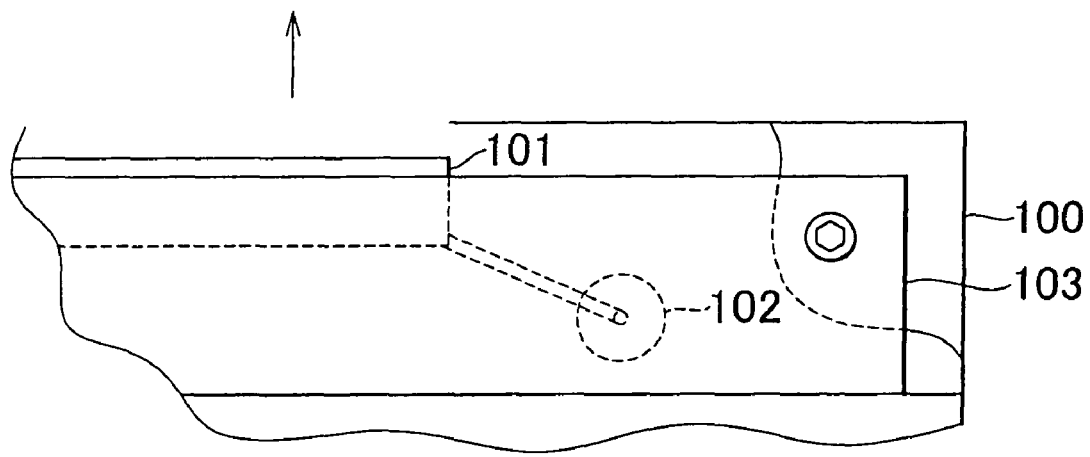
FIG. 9 is a plan view partially showing the construction of a cover for a vehicle according to a prior art.

In the above embodiment, the light introduction opening 12 is formed in the cover 10 at a position behind the reservoir tank 7. Alternatively, as shown in FIGS. 7 and 8, a light introduction opening 28 may be formed in the cover 10 ahead of the reservoir tank 7.

The cover for a vehicle according to the present invention may be applied to other types of covers for a vehicle, rather than the intake system cover 10 in the above embodiment. Examples of such covers include those for the purpose of improving the design of the engine compartment, preventing various members in the engine compartment from being soiled with dust or the like.

Light introduced through the light introduction opening may not necessarily be directed directly toward the liquid level gauge of the reservoir tank, but may instead be directed toward the liquid level gauge after being diffusely reflected by another portion at a side of the reservoir tank. The point is that light needs only to be introduced in such a way that allows the liquid level gauge to be visually inspected.

While the invention has been described with reference to example embodiments thereof, it is to be understood that the invention is not limited to the described embodiments or constructions. To the contrary, the invention is intended to cover various modifications and equivalent arrangements. In addition, while the various elements of the example embodiments are shown in various combinations and configurations, other combinations and configurations, including more, less or only a single element, are also within the spirit and scope of the invention.

What is claimed is:

1. A cover for a vehicle with a hood, the cover being mounted to an engine compartment so as to cover from above a reservoir tank completely covered by the cover that stores coolant for an engine, the cover comprising:
   a light introduction opening formed in the cover so that light is introduced and directed toward a liquid level gauge at a side of the reservoir tank, the light introduction opening includes a plurality of slits extending in parallel to each other, the light introduction opening is formed at a position displaced in a direction of a plane where the cover extends, from a position opposite to a top of the reservoir tank; and
   a slit defining part, positioned between adjacent slits, is slanted such that a lower end of the slit defining part is closer to the reservoir tank than an upper end of the slit defining part.

2. The cover for a vehicle according to claim 1, wherein at least a part of an opening edge of the plurality of slits includes an extension that extends obliquely downward toward the reservoir tank from the opening edge of the plurality of slits.

3. The cover for a vehicle according to claim 1, wherein at least a part of an opening edge of the plurality of slits includes an extension that extends obliquely upward away from the reservoir tank from the opening edge of the plurality of slits.

4. The cover for a vehicle according to claim 1, wherein the light introduction opening is formed at a position behind the reservoir tank in the longitudinal direction of the vehicle.

5. The cover for a vehicle according to claim 1, wherein the light introduction opening is formed at a position ahead of the reservoir tank in the longitudinal direction of the vehicle.

6. The cover for a vehicle according to claim 1, wherein a mounting part for mounting the cover to the engine compartment is formed adjacent to the light introduction opening.

7. The cover for a vehicle according to claim 1, wherein:
   the cover is mounted to the engine compartment so as to cover an intake system of the engine; and
   a seal is provided between the cover and an engine hood to prevent heated air in the engine compartment from being inducted through an air intake of the intake system.

8. A cover for a vehicle with a hood, the cover being mounted to an engine compartment so as to cover from above a reservoir tank completely covered by the cover that stores coolant for an engine, the cover comprising:
   a light introduction opening formed in the cover so that light is introduced and directed toward a liquid level gauge at a side of the reservoir tank,
   the light introduction opening is formed to be generally rectangular at a position displaced in a direction of a plane where the cover extends, from a position opposite to a top of the reservoir tank; and
   the light introduction opening is provided with an extension that extends obliquely downward toward the reservoir tank from an opening edge farthest from the reservoir tank.

9. The cover for a vehicle according to claim 8, wherein the light introduction opening is formed at a position behind the reservoir tank in the longitudinal direction of the vehicle.

10. The cover for a vehicle according to claim 8, wherein the light introduction opening is formed at a position ahead of the reservoir tank in the longitudinal direction of the vehicle.

11. The cover for a vehicle according to claim 8, wherein a mounting part for mounting the cover to the engine compartment is formed adjacent to the light introduction opening.

12. The cover for a vehicle according to claim 8, wherein:
   the cover is mounted to the engine compartment so as to cover an intake system of the engine; and
   a seal is provided between the cover and an engine hood to prevent heated air in the engine compartment from being inducted through an air intake of the intake system.

13. A cover for a vehicle with a hood, the cover being mounted to an engine compartment so as to cover from above a reservoir tank completely covered by the cover that stores coolant for an engine, the cover comprising:
   a light introduction opening formed in the cover so that light is introduced and directed toward a liquid level gauge at a side of the reservoir tank,
   the light introduction opening is formed to be generally rectangular at a position displaced in a direction of a plane where the cover extends, from a position opposite to a top of the reservoir tank; and
   the light introduction opening is provided with an extension that extends obliquely upward away from the reservoir tank from an opening edge closest to the reservoir tank.

14. The cover for a vehicle according to claim 13, wherein the light introduction opening is formed at a position behind the reservoir tank in the longitudinal direction of the vehicle.

15. The cover for a vehicle according to claim 13, wherein the light introduction opening is formed at a position ahead of the reservoir tank in the longitudinal direction of the vehicle.

16. The cover for a vehicle according to claim 13, wherein a mounting part for mounting the cover to the engine compartment is formed adjacent to the light introduction opening.

17. The cover for a vehicle according to claim 13, wherein:
   the cover is mounted to the engine compartment so as to cover an intake system of the engine; and
   a seal is provided between the cover and an engine hood to prevent heated air in the engine compartment from being inducted through an air intake of the intake system.

18. A cover for a vehicle with a hood, the cover being mounted to an engine compartment so as to cover from above a reservoir tank completely covered by the cover that stores coolant for an engine, the cover comprising
   a light introduction opening formed in the cover so that light is introduced and directed toward a liquid level gauge at a side of the reservoir tank, the cover is mounted to the engine compartment so as to cover an intake system of the engine;
   a seal is provided between the cover and an engine hood to prevent heated air in the engine compartment from being inducted through an air intake of the intake system;

a visual inspection opening for allowing visual inspection of the liquid level gauge is formed separately from the light introduction opening; and the light introduction opening is formed nearer the reservoir tank than the visual inspection opening.

19. The cover for a vehicle according to claim 18, wherein the light introduction opening is formed at a position behind the reservoir tank in the longitudinal direction of the vehicle.

20. The cover for a vehicle according to claim 18, wherein the light introduction opening is formed at a position ahead of the reservoir tank in the longitudinal direction of the vehicle.

21. The cover for a vehicle according to claim 18, wherein a mounting part for mounting the cover to the engine compartment is formed adjacent to the light introduction opening.

* * * * *